United States Patent
Kugelev et al.

(10) Patent No.: US 6,209,561 B1
(45) Date of Patent: Apr. 3, 2001

(54) EMERGENCY PRESSURE RELIEF VALVE

(75) Inventors: Vladimir S. Kugelev, Fort Worth; Mark D. Matzner, Burleson, both of TX (US)

(73) Assignee: SPM Flow Control, Inc., Fort Worth, TX (US)

( * ) Notice: Subject to any disclaimer, the term of this patent is extended or adjusted under 35 U.S.C. 154(b) by 0 days.

(21) Appl. No.: 09/514,418

(22) Filed: Feb. 28, 2000

(51) Int. Cl.[7] .................................................. F16K 21/10
(52) U.S. Cl. .......................... 137/14; 137/514.7; 251/54
(58) Field of Search .............................. 137/514.5, 514.7, 137/514, 528, 14, 529; 251/54, 48

(56) References Cited

U.S. PATENT DOCUMENTS

| | | | | |
|---|---|---|---|---|
| 1,379,092 | * | 5/1921 | Fraccascia et al. | 137/514.7 |
| 1,889,256 | * | 11/1932 | Lipscomb et al. | 137/514.7 |
| 2,361,881 | * | 11/1944 | Sheppard | 137/514.7 |
| 2,506,162 | * | 5/1950 | Metzgar | 137/514.7 |
| 3,789,872 | * | 2/1974 | Elliott | 137/514 |
| 3,845,876 | * | 11/1974 | Needham et al. | 137/514.5 |
| 3,881,480 | * | 5/1975 | Lafourcade | 137/514.5 |
| 3,942,551 | * | 3/1976 | Schuller et al. | 137/514 |
| 4,046,164 | * | 9/1977 | Pool | 137/514.7 |
| 4,221,204 | * | 9/1980 | Meyer | 137/514.7 |
| 4,274,434 | * | 6/1981 | Hafele | 137/514.5 |
| 4,321,945 | * | 3/1982 | Chabat-Courrede | 137/514.7 |
| 4,485,843 | * | 12/1984 | Wolff | 137/514 |
| 4,531,542 | * | 7/1985 | Looney | 137/514.5 |
| 4,716,930 | * | 1/1988 | Richmond et al. | 137/514.5 |
| 5,441,072 | * | 8/1995 | Indey et al. | 137/514.7 |
| 5,443,088 | * | 8/1995 | Hoch et al. | 137/514.7 |
| 5,685,334 | * | 11/1997 | Hagan | 137/514.7 |
| 5,787,926 | * | 8/1998 | Mukumoto et al. | 137/514.5 |

OTHER PUBLICATIONS

Reset Relief Valves brochure; Harrisburg, Inc.; 1982.
Retsco Inc.; Valve illustration; Aug. 1992.
An Introduction to Rupture Disk Technology catalog; BS&B; 1994.
Emergency Relief Valve brochure; SPM; Apr. 1997.
BJ 285959; Popoff Valve information; BJ Services; undated.

* cited by examiner

*Primary Examiner*—John Rivell
(74) *Attorney, Agent, or Firm*—Bracewell & Patterson, LLP; James E. Bradley

(57) ABSTRACT

An emergency pressure relief valve has a housing fluidly connected to a pressurized system line carrying a system fluid. The housing carries a piston and a valve member which move within the housing between a closed position and an open position. The piston defines an upper chamber and a lower chamber within the housing. A control fluid is supplied to the upper chamber, and the pressure of the control fluid exerts a biasing force to a first side of the piston. The biasing force holds the valve member and piston in a closed position when the pressure of the system fluid is at an acceptable level. As the pressure of the system fluid rises above the acceptable level, the valve member moves to an open position. While the piston moves from the closed position to the open position, a delay fluid is injected into the lower chamber. As the delay fluid is expelled from the chamber, it delays a return of the piston and valve member to the closed position. As the piston and valve member return from the open position to the closed position, the delay fluid in the lower chamber flows to the upper chamber through a check valve carried by the piston.

19 Claims, 3 Drawing Sheets

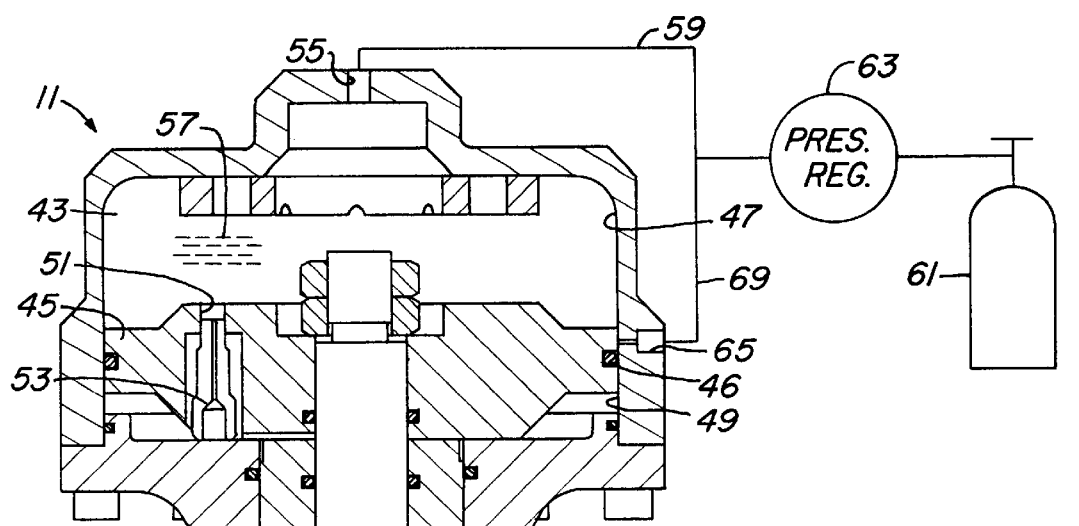
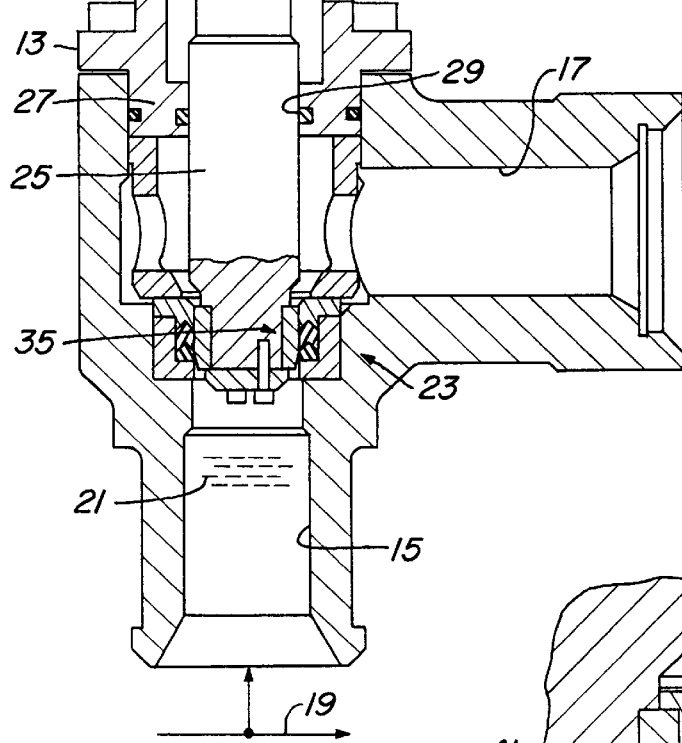
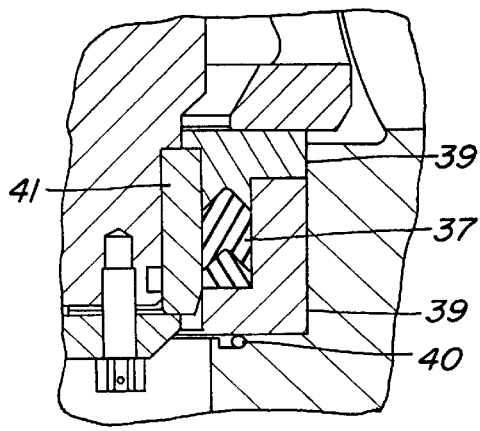
Fig. 1
Fig. 2

EMERGENCY PRESSURE RELIEF VALVE

FIELD OF THE INVENTION

This invention relates in general to valves and in particular to an emergency pressure relief valve that relieves a pressure of a system fluid by entering an open position and then by returning to the normally-closed position following a delay period.

DESCRIPTION OF RELATED ART

In a fluid transport system having a system fluid with a pressure that varies, it is often desirable to relieve or lower the pressure of the system fluid if the pressure reaches an unacceptably high level. The most common way of relieving these high pressures is by use of an emergency pressure relief valve. The emergency pressure relief valve, which is in fluid communication with the system fluid, is designed to detect an unacceptable pressure level and relieve the pressure by opening the valve and allowing the system fluid to escape the system line.

A problem sometimes develops in the use of these valves in systems that can experience rapidly growing pressures, especially with high flow rates. For example, in certain oil and gas well drilling operations, high pressure drilling mud is pumped down the well to cool the drill bit and circulate cuttings to the surface. Large high pressure reciprocating pumps at the surface pump the liquid through flow lines leading into the well. In these systems, the pressure in the system lines can rapidly become unacceptably high unless an emergency relief valve very quickly relieves the pressure, A typical emergency pressure valve for use in one of these systems includes a housing having an inlet port and an outlet port. The inlet port is connected to the system line. A valve member is located within the housing that is capable of moving between an open position and a closed position. In the open position, fluid communication is allowed between the inlet port and the outlet port. In the closed position, the valve member sealingly engages a portion of the housing, thereby preventing fluid communication between the inlet port and the outlet port. The valve member is biased such that it remains in the closed position when the pressure of the system fluid is at an acceptable level. As the pressure rises above an acceptable level, the valve member moves rapidly to an open position, thereby relieving the pressure by allowing the fluid to flow out of the outlet port of the valve.

In some relief or pressure regulating type valves, the spring simply snaps the valve back closed after the pressure returns below the set level. In other prior art types, which are true emergency pressure relief valves, the valve generally remains open once the maximum pressure is exceeded, and does not return by itself to a closed position once the pressure drops below the set level. For example, one type employs a rupture disk wherein the disk has to be replaced after it is ruptured due to the pressure exceeding the maximum level. Replacing the rupture disk can be time consuming and requires shutting off fluid pressure to the emergency relief valve. In another emergency relief type, a manual reset feature requires an operator to mechanically reset the valve once the valve has moved to an open position. Valves of this type typically use a valve member that is biased into the closed position by a mechanical spring. As the pressure of the system fluid rises to an unacceptable level, the valve member moves to an open position. Once it reaches the open position, the valve member is locked until an operator manually resets the valve, allowing the valve member to return the closed position. The problem with this type of valve is that it requires extensive operator monitoring. Additionally, because the valve will not return to a closed position until manually reset, once the valve is opened, the system fluid will continue to be expelled from the valve even if the pressure returns to an acceptable level.

BRIEF SUMMARY OF THE INVENTION

The emergency pressure valve according to the present invention solves the problems associated with the prior art. The emergency pressure valve of the present invention includes a piston that is connected to one end of the valve member. The piston is disposed within a pressure chamber in the housing, the piston defining an upper chamber and a lower chamber within the pressure chamber. The piston and the valve member are adapted to move together from the open position to the closed position. The valve according to the present invention uses a control fluid such as nitrogen gas or compressed air, which is introduced into the upper chamber. The pressure of the control fluid exerts a biasing force on the piston, which pushes the piston and the valve member into the closed position. The valve member and piston move to the open position when the force exerted on the valve member by the system fluid exceeds the force exerted on the piston by the control fluid.

Unlike the prior art valves, the emergency pressure valve according to the present invention uses a delay fluid to delay a return of the valve member from the open position to the closed position. As the valve is exposed to a system fluid with an unacceptably high pressure, the valve moves from the closed position to the open position. Between the closed and open positions is an intermediate position, at which point a delay fluid is introduced into the chamber beneath the piston. The pressure of the delay fluid provides a delay force to the piston which is opposite in direction to the biasing force provided by the control fluid. As the pressure of the system fluid returns to an acceptable level, the delay fluid acts against the piston to delay the return of the piston to the closed position. As the piston and valve member return to the closed position, the delay fluid flows from the portion of the chamber below the piston. Preferably, the delay fluid travels from below the piston into the chamber above the piston by way of a check valve carried by the piston. Also, preferably the delay fluid is nitrogen gas or compressed air.

BRIEF DESCRIPTION OF THE DRAWINGS

FIG. 1 is a cross-sectional view of a valve according to the present invention, the valve being shown in a closed position.

FIG. 2 is an enlarged view of a portion of the valve of FIG. 1, showing a seating area of the valve of FIG. 1.

DETAILED DESCRIPTION OF THE PREFERRED EMBODIMENT

Figure 3:
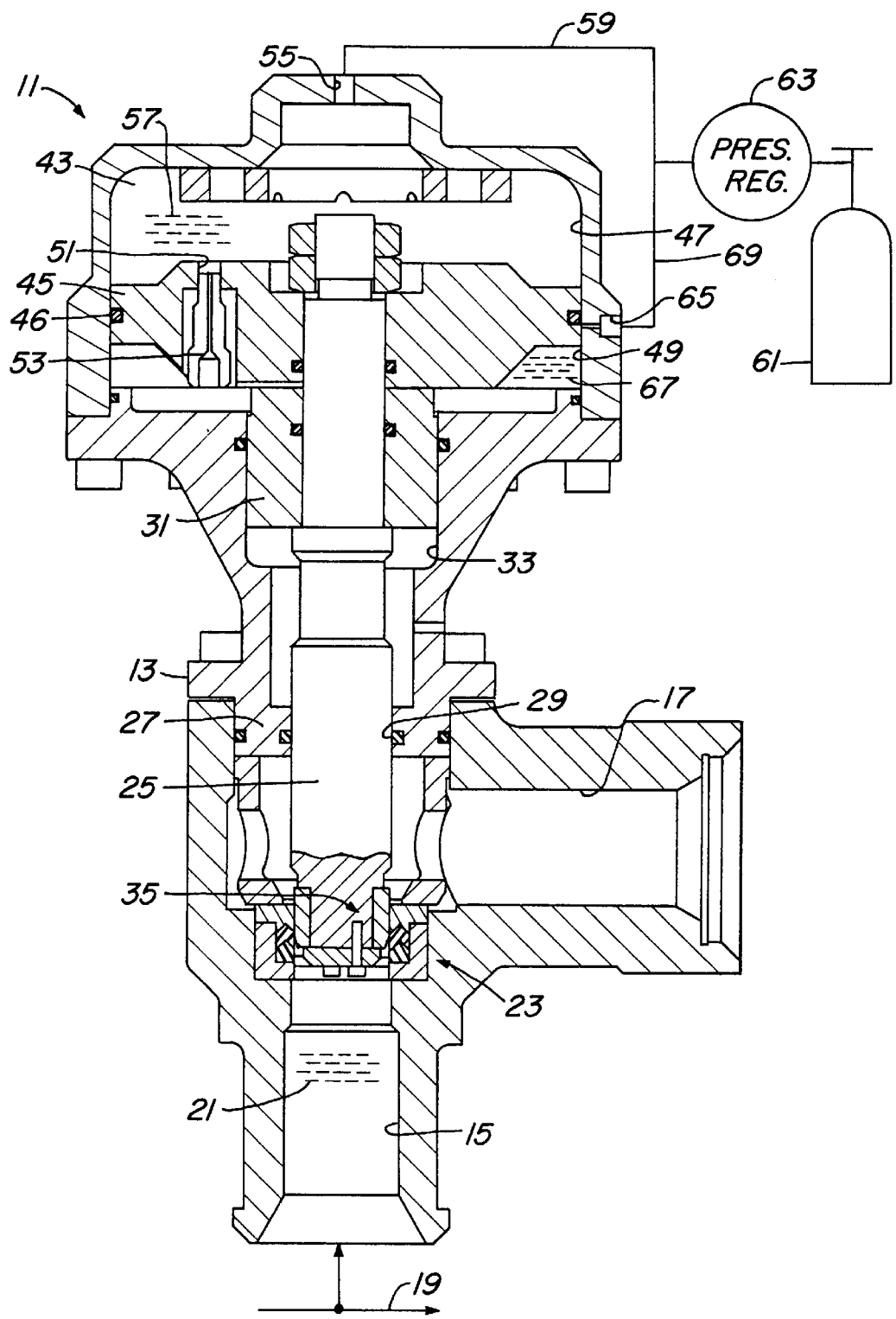
FIG. 3 is a cross-sectional view of the valve of FIG. 1, the valve being shown in an intermediate position.

Referring to FIGS. 1–4 in the drawings, the preferred embodiment of an emergency pressure valve 11 according to the present invention is illustrated. Valve 11 includes a housing 13 having a wall and a relief passage with an inlet 15 and an outlet 17. In the example in the drawings, inlet 15 is situated such that its longitudinal axis intersects and forms a right angle to the longitudinal axis of outlet 17, although this could differ. A system line 19 is fluidly connected to inlet 15, system line 19 carrying a system fluid 21 which is introduced to valve 11 through inlet 15. A valve seat 23 is disposed within housing 13 between inlet 15 and outlet 17.

A valve member 25 having an upper end and a lower end is slidingly disposed within housing 13. In this embodiment, the longitudinal axis of valve member 25 is coaxial to the axis of inlet 15, although it could differ. Valve member 25 passes through a partition 27. A seal 29 provides a sealing engagement between partition 27 and valve member 25. Toward its upper end, valve member 25 is engaged by a guide 31 which is disposed within a counterbore 33. Guide 31 is used to control the translational movement of valve member 25 within housing 13 so that it moves in a direction parallel to the longitudinal axis of valve member 25. A sealing area 35 is located at the lower end of valve member 25.

Figure 4:
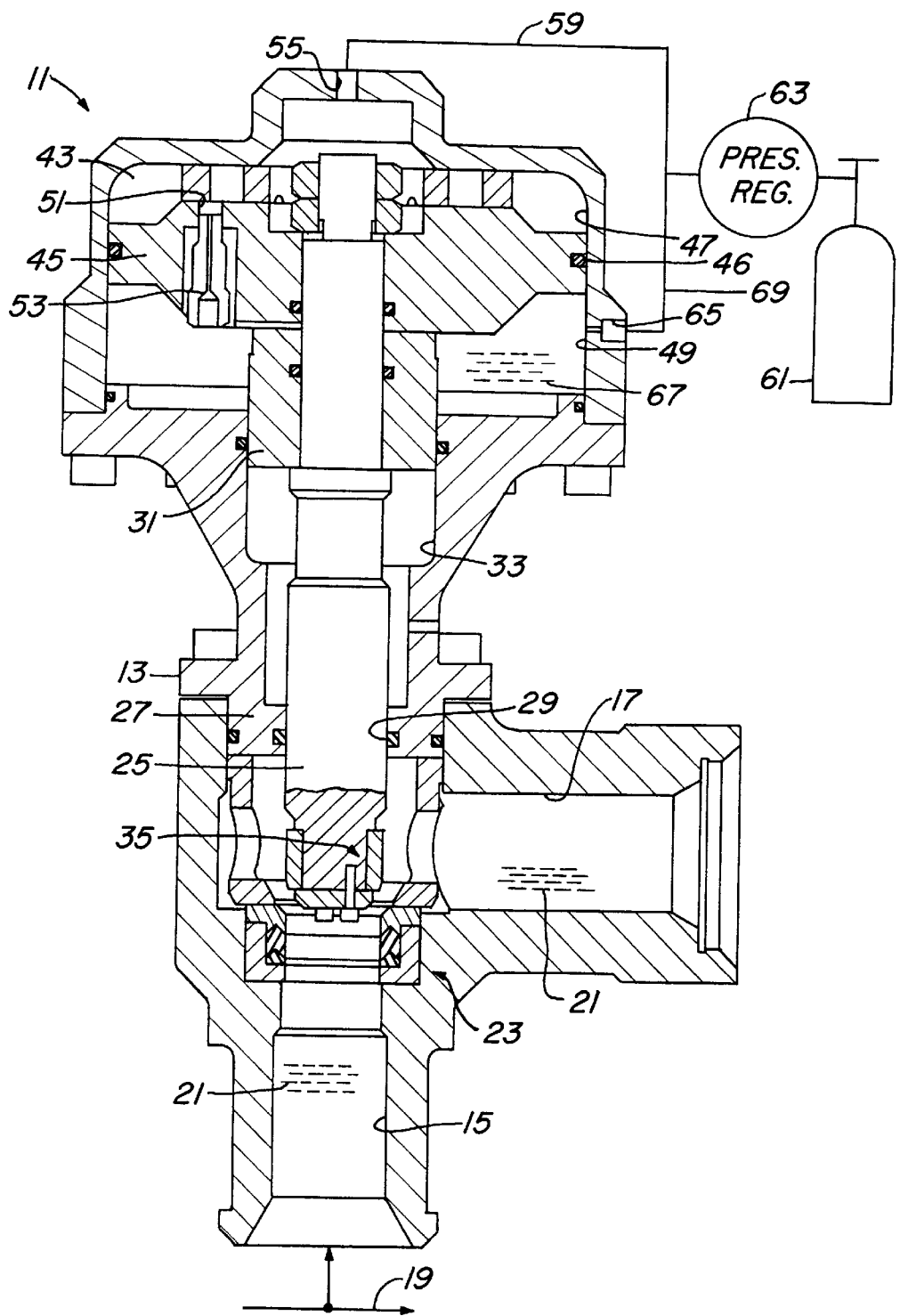
FIG. 4 is a cross-sectional view of the valve of FIG. 1, the valve being shown in an open position.

Valve member 25 is adapted to move within housing 13 between a closed position shown in FIG. 1 and an open position shown in FIG. 4. In the closed position, sealing area 35 fully engages valve seat 23 to block flow of system fluid 21 through the relief passage. In the open position, sealing area 35 no longer engages valve seat 23, thereby allowing flow of system fluid 21 through the relief passage.

Referring now to FIG. 2 in the drawings, the components associated with valve seat 23 and sealing area 35 are illustrated. The components of valve seat 23 work cooperatively with the components of sealing area 35 to block flow of system fluid 21 through the relief passage when valve member 25 is in the closed position. Valve seat 23 includes a seal 37 secured by an upper and a lower retainer 39. Lower retainer 39 engages a seal 40 (FIG. 2) in an interior wall of housing 13 to prevent leakage of system fluid 21 when valve member 25 is in the closed position.

The primary component associated with sealing area 35 is a bushing 41 which is releasably connected to valve member 25. Bushing 41 is sealingly disposed in a circumferential depression milled in the lower end of valve member 25. Bushing 41 forms a sealing engagement with seal 37 when valve member 25 is in the closed position. The sealing engagement between seal 37 and bushing 41 provides the primary method of sealing the relief passage when valve member 25 is in the closed position.

Referring again to FIGS. 1, 3, and 4, a pressure chamber 43 is formed within housing 13, the pressure chamber being annular in shape with an inner annular surface. A pressure barrier or piston 45 is connected to the upper end of valve member 25. Piston 45 is annular in shape and has an upper, or first side and a lower, or second side. Piston 45 has a seal 46 that sealingly and slidingly engages the inner annular surface of pressure chamber 43. Piston 45 moves within chamber 43 in conjunction with valve member 25 between the open and closed positions.

Seal 46 of piston 45 divides pressure chamber 43 into an upper portion 47 and a lower portion 49. A delay passage 51 extends through piston 45 and carries a check valve 53. Together, delay passage 51 and check valve 53 make up a delay fluid outlet port, providing unidirectional fluid communication between lower portion 49 below piston 45 and upper portion 47 above piston 45. In the preferred embodiment, fluid communication through check valve 53 is possible only when fluid flow is from lower portion 49 to upper portion 47. Check valve 53 prevents fluid flow from upper portion 47 to lower portion 49.

An upper injection port 55 is located in the wall of housing 13 for providing a pressurized control fluid 57 to upper portion 47. Upper injection port 55 is located on the top of chamber 43. Control fluid 57 is delivered to valve 11 through upper injection port 55 by a control fluid line 59 which is fluidly connected to a pressurized fluid source 61. The pressure of control fluid 57 delivered to valve 11 is regulated by a pressure regulator 63 located between fluid source 61 and valve 11.

A lower injection port, or delay fluid inlet port 65 located in the wall of housing 13 for providing a pressurized delay fluid 67 (see FIGS. 3 and 4) to lower portion 49 when seal 46 of piston 45 is above delay fluid inlet port 65, as shown in the intermediate position (FIG. 3) and the open position (FIG. 4). Delay fluid injection port 65 is located in the sidewall of pressure chamber 43 between upper and lower ends, and slightly closer to the lower end. When valve member 25 is in the closed position shown in FIG. 1, piston seal 46 is below delay fluid injection port 65, allowing fluid communication of fluid from delay fluid injection port 67 only with upper portion 47. Delay fluid 67 is delivered to valve 11 by a delay fluid line 69. In the preferred embodiment, delay fluid line 69 is connected to the same pressurized fluid source 61 that supplies control fluid 57. The preferred embodiment of the present invention uses pressurized nitrogen gas or air as both the delay fluid and the control fluid and supplies the gas to the valve at the same pressure.

The upper side of piston 45 has a pressure area proportional to the squared value of the diameter of pressure chamber 43. The lower side of piston 45 has a pressure area proportional to the squared value of the diameter of chamber 43 minus the squared value of the outer diameter of guide 31. The result is that the upper pressure area of piston 45 is greater than the lower pressure area. If the pressure on both upper and lower sides of piston 45 is the same, the net pressure force is downward. The significance of the delay fluid entering chamber lower portion 49 and the difference in the pressure areas is explained below in relation to the operation of valve 11.

Referring now primarily to FIGS. 1, 3, and 4, the operation of valve 11 is illustrated. Relief passage inlet 15 is connected to system line 19 to control the pressure of system fluid 21. During a low pressure operation, when the pressure of system fluid 21 is below or at an acceptable level, valve member 25 is in the closed position (see FIG. 1). During a high pressure operation, when the pressure of system fluid 21 is above the acceptable level, valve member 25 moves to the open position (see FIG. 4). When piston seal 46 has moved above delay fluid inlet port 65, delay fluid 67 enters chamber lower portion 49 and accordingly the net valve closing control force significantly reduces. Due to that, valve member 25 rapidly moves into the open position. In the open position, system fluid 21 is allowed to flow through the relief passage, exiting the valve through outlet 17. As explained below, valve member 25 will stay in the open position for a selected duration even after the upward fluid force from system fluid 21 exerted on sealing member 35 of valve member 25 has dropped below the net downward control force exerted on piston 45.

In the preferred embodiment, the acceptable level of pressure of system fluid 21 is determined and set by the pressure of control fluid 57, which is introduced into upper portion 47 through upper injection port 55. The presence of pressurized control fluid 57 in upper portion 47 causes a biasing force to be exerted on the upper side of piston 45. The biasing force pushes piston 45 and valve member 25 into the closed position (see FIG. 1). Piston 45 and valve member 25 remain in the closed position while system fluid 21 is below the maximum pressure level. When the pressure of system fluid 21 exceeds the acceptable level, the force exerted by system fluid 21 on the lower end of valve member 25 exceeds the biasing force exerted on the upper side of piston 45, thereby causing valve member 25 and piston 45 to move into the open position (see FIG. 4). Valve member 25 will stay in the open position during high pressure operation of valve 11. System fluid 21 flows through relief passage outlet 17.

As previously mentioned, the position of lower injection port 65 only allows fluid communication with lower portion 49 when piston seal 46 is above lower injection port 65, which is in the intermediate and open positions (FIGS. 3 and 4). While piston 45 is in the closed position, piston seal 46 is below lower injection port 65, and thus communicates with upper portion 47. As piston 45 moves from the closed position into the intermediate position and then into the open position, lower injection port 65 comes into fluid communication with lower portion 49, causing delay fluid 67 to enter lower portion 49. The pressure of delay fluid 67 exerts a delay force on the lower side of piston 45 that is opposed to the downward directed biasing force on piston 45.

The delay force against piston 45 delays the return of piston 45 and valve member 25 to the closed position. As the pressure of system fluid 21 drops to an acceptable level, the upward force exerted on the lower end 35 of valve member 25 decreases below the net control force exerted on the upper side of piston 45. In a valve not containing the advantages of the present invention, the disparity between these two forces would immediately move piston 45 and valve member 25 back to the closed position. However, the delay force exerted by delay fluid 67 on the lower side of piston 45 delays the return of valve member 25 to the closed position even though the pressure of system fluid 21 has returned to the acceptable level.

The delay force exerted on the lower side of piston 45 by delay fluid 67 is less than the biasing force exerted on the upper side of piston 45 by control fluid 57. This is true even though the pressure of delay fluid 67 in lower portion 49 is equal to the pressure of control fluid 57 in upper portion 47. The difference in the two forces is due to the difference in pressure areas of the two sides of piston 45. As previously mentioned, the pressure area of the upper side of piston 45 is greater than the pressure area of the lower side of piston 45. Because of this, when each side is exposed to the same given pressure, the force exerted on the upper side is greater than that exerted on the lower side.

The difference in forces across the two sides of piston 45 allows piston 45 and valve member 25 to slowly return to the closed position after valve 11 has returned to low pressure operation. In the preferred embodiment, as piston 45 moves from the open position to the closed position, the volume of lower portion 49 decreases, thereby causing delay fluid 67 to flow from lower portion 49 to upper portion 47 through check valve 53. As delay fluid 67 exits lower portion 49, piston 45 and valve member 25 are returned to the closed position.

The primary advantage of the present invention involves the use of a delay fluid. The delay fluid reduces or eliminates problems with the prior art emergency relief valves. The problems involved with a rupture disk or a manually resettable valve are eliminated. The delay fluid is automatically introduced to the valve as the valve member opens, causing a delayed return of the valve member to the closed position once the system fluid returns to an acceptable pressure. It requires no monitoring or manual resetting.

It should be apparent from the foregoing that an invention having significant advantages has been provided. While the invention is shown in only one of its forms, it is not just limited but is susceptible to various changes and modifications without departing from the spirit thereof.

We claim:

1. An emergency pressure relief valve, comprising:
    a housing with a relief passage, a valve seat therein, a pressure chamber;
    a movable valve member in the housing, adapted to be exposed to pressure in a system and movable from a closed position to an open position, the valve member engaging the valve seat in the closed position to block flow through the relief passage, the valve member moving rapidly away from the valve seat in the open position to allow flow through the relief passage while the pressure in the system is sufficiently high;
    a movable pressure barrier carried in the pressure chamber and operably connected to the valve member, the pressure barrier adapted to receive a biasing force, the biasing force acting against a first side of the pressure barrier, urging the valve member to the closed position;
    a pressurized delay fluid located in the chamber on a second side of the pressure barrier when the valve member is in the open position, the pressure of the delay fluid exerting an opposed force on the second side of the pressure barrier that is opposed to the biasing force for delaying a return of the valve member from the open position back to the closed position due to the biasing force; and
    a delay fluid outlet port operably associated with the chamber on the second side of the pressure barrier, the delay fluid outlet port allowing the delay fluid to move out of the portion of the chamber on the second side of the pressure barrier at a rate that slows the return of the valve member to the closed position.

2. The improved valve according to claim 1, wherein the pressure chamber is adapted to receive a pressurized control fluid, the control fluid providing the biasing force to act against the first side of the pressure barrier.

3. The valve according to claim 1, wherein the delay fluid outlet port is carried by the pressure barrier to allow flow of the delay fluid into the pressure chamber on the first side of the pressure barrier.

4. The valve according to claim 1, wherein the pressure barrier is a piston adapted to sealingly and slidingly engage an annular wall of the pressure chamber.

5. The valve according to claim 1 further comprising:
    a control fluid source for supplying a pressurized control fluid to the pressure chamber, the control fluid providing the biasing force to act against the first side of the pressure barrier; and
    wherein the control fluid source also supplies the delay fluid, the delay fluid being the same fluid as the control fluid.

6. The improved valve according to claim 1 further comprising:
    a control fluid source for supplying a pressurized compressible control fluid to the pressure chamber, the control fluid providing the biasing force to act against the first side of the pressure barrier; wherein
    the control fluid source also supplies the delay fluid, the delay fluid being the same fluid as the control fluid;
    the delay fluid and the control fluid are supplied by the control fluid source to the pressure chamber at the same pressure; and
    the first side of the pressure barrier has a greater pressure area than the second side of the pressure barrier, causing the biasing force to be greater than the opposed force.

7. The improved valve according to claim 1 further comprising:
a control fluid source for supplying a pressurized compressible control fluid to the pressure chamber, the control fluid providing the biasing force to act against the first side of the pressure barrier; wherein
the delay fluid outlet port is located in the pressure barrier for allowing flow of the delay fluid from the second side of the pressure barrier to the first side of the pressure barrier; and
the delay fluid is also supplied by the control fluid source, is the same fluid as the control fluid, and is supplied to the pressure chamber by the control fluid source at the same pressure as the control fluid.

8. The improved valve according to claim 1 further comprising:
a control fluid source for supplying a pressurized compressible control fluid to the pressure chamber, the control fluid providing the biasing force to act against the first side of the pressure barrier; wherein
the delay fluid outlet port is located in the pressure barrier to allow flow of the delay fluid from the second side of the pressure barrier to the first side of the pressure barrier;
the delay fluid is also supplied by the control fluid source, is the same fluid as the control fluid, and is supplied to the pressure chamber by the control fluid source at the same pressure as the control fluid; and
the first side of the pressure barrier has a greater pressure area than the second side of the pressure barrier, causing the valve member to move to the closed position even though the pressures on the first and second sides of the pressure barrier are the same.

9. A valve having a housing with a relief passage and a valve seat therein for relieving a pressure of a system fluid in a pressurized system line, the valve comprising:
a movable valve member adapted to be exposed to the system fluid and adapted to move from a closed position to an open position, the valve member engaging the valve seat in the closed position to block flow through the relief passage, the valve member moving upward from the valve seat in the open position to allow flow through the relief passage while the pressure of the system fluid is sufficiently high;
a pressure chamber having an upper portion and a lower portion being separated by a piston slidably carried in the pressure chamber;
the piston being operably connected to the valve member for movement between the open and closed positions;
a pressurized compressible control fluid in the upper portion of the chamber, the control fluid acting against an upper side of the piston for supplying a biasing force for urging the valve member to the closed position, the piston moving upward in the chamber to open the valve member if pressure in the system line reaches a selected maximum;
a delay fluid conduit for supplying a pressurized compressible delay fluid to the lower portion of the chamber, for exerting an opposed force against the piston that is opposed to but less than the biasing force for delaying downward movement of the piston and a return of the valve member back to the closed position; and
a check valve operably associated with the lower portion of the chamber, the check valve allowing the delay fluid to flow out of the lower portion of the chamber as the piston moves downward.

10. The valve according to claim 9, wherein the check valve is carried by the piston within a delay passage connecting the upper and lower portions of the chamber, the check valve allowing the delay fluid to move from the lower portion of the chamber to the upper portion of the chamber, but preventing flow from the upper portion to the lower portion.

11. The valve according to claim 9, wherein the control fluid in the upper portion of the chamber is operably connected to the delay fluid conduit, and wherein the delay fluid is the same fluid as the control fluid.

12. The valve according to claim 9, wherein:
the control fluid and the delay fluid are the same;
the control fluid and the delay fluid are at the same pressure; and
the upper side of the piston has a greater pressure area than the lower side of the piston, causing the biasing force to be greater than the opposed force.

13. The valve according to claim 9:
wherein the check valve is carried by the piston, the check valve allowing the delay fluid to move from the lower chamber to the upper chamber as the piston returns the valve member to the closed position; and
wherein the control fluid and the delay fluid are at the same pressure.

14. A valve having a housing, with a relief passage and a valve seat therein for relieving a pressure of a system fluid in a pressurized system line, the valve comprising:
a movable valve member adapted to be exposed to the system fluid and adapted to move from a closed position to an open position, the valve member engaging the valve seat in the closed position to block flow through the relief passage, the valve member moving upward from the valve seat in the open position to allow flow through the relief passage while the pressure of the system fluid is sufficiently high;
a pressure chamber having an upper portion and a lower portion being separated by a piston slidably carried in the pressure chamber;
the piston being operably connected to the valve member for movement between the open and closed positions;
a control fluid source for supplying a pressurized control fluid to the upper portion of the chamber, the control fluid acting against an upper side of the piston for urging the valve member to the closed position, the piston moving upward in the chamber to open the valve member if pressure in the system line reaches a selected maximum;
a delay fluid conduit for supplying a pressurized delay fluid to the lower portion of the chamber for delaying downward movement of the piston and a return of the valve member back to the closed position;
a check valve operably associated with the lower portion of the chamber, the check valve allowing the delay fluid to flow out of the lower portion of the chamber as the piston moves downward; and
wherein the delay fluid conduit is connected to a delay fluid inlet port in a sidewall of the chamber; wherein the piston exposes the delay fluid inlet port to the upper portion of the pressure chamber while the valve member is in the closed position, and exposes the delay fluid inlet port to the lower portion of the pressure chamber while the valve member is in the open position.

15. A method of relieving a pressure of a system fluid in a pressurized system line having a valve having a housing with a relief passage, a valve seat, and a pressure chamber therein, the method comprising the steps of:

- disposing a movable valve member within the housing, the valve member adapted to be exposed to the system fluid and adapted to move from a closed position to an open position, the valve member engaging the valve seat in the closed position to block flow through the relief passage;
- operably connecting the valve member to a pressure barrier disposed in the pressure chamber;
- supplying a biasing force against a first side of the pressure barrier, urging the valve member to the closed position;
- opening the valve by moving the valve member to the open position while the pressure of the system fluid is sufficiently high to overcome the biasing force, the open position of the valve member allowing flow through the relief passage;
- introducing a pressurized delay fluid to the pressure chamber on a second side of the pressure barrier while the valve member is in the open position; then,
- delaying a return of the valve member back to the closed position by exerting with the pressurized delay fluid an opposed force on the second side of the pressure barrier;
- operably associating a delay fluid outlet port with the pressure chamber on the second side of the pressure barrier; and
- expelling the delay fluid from the second side of the pressure barrier through the delay fluid outlet port at a rate that slows the return of the valve member to the closed position.

16. The method according to claim 15, wherein the step of supplying a biasing force comprises the step of introducing a pressurized control fluid to the pressure chamber on the first side of the pressure barrier.

17. The method according to claim 15, wherein the step of supplying a biasing force and the step of introducing a delay fluid comprise:

- introducing a pressurized compressible control fluid to the pressure chamber on both the first and second sides of the pressure barrier, the control fluid on the first side providing the biasing force to the first side of the pressure barrier, and the control fluid on the second side serving as the delay fluid.

18. The method according to claim 15, wherein the step of supplying a biasing force and the step of introducing a delay fluid comprise:

- introducing a pressurized compressible control fluid to the pressure chamber on both the first and second sides of the pressure barrier, the control fluid on the first side providing the biasing force to the first side of the pressure barrier, the control fluid on the second side serving as the delay fluid, and the control fluid on the first side and the control fluid on the second side being supplied to the pressure chamber at the same pressure; wherein
- the first side of the pressure barrier has a greater pressure area than the second side of the pressure barrier, causing the biasing force to be greater than the opposed force.

19. The method according to claim 15, wherein the delay fluid is introduced only after the valve has moved to the open position.

* * * * *